(12) United States Patent
Osorio

(10) Patent No.: US 12,453,508 B2
(45) Date of Patent: Oct. 28, 2025

(54) PATHOLOGICAL STATE DETECTION USING DYNAMICALLY DETERMINED BODY DATA VARIABILITY RANGE VALUES

(71) Applicant: Flint Hills Scientific, L.L.C., Lawrence, KS (US)

(72) Inventor: Ivan Osorio, Leawood, KS (US)

(73) Assignee: FLINT HILLS SCIENTIFIC, LLC., Lawrence, KS (US)

( * ) Notice: Subject to any disclaimer, the term of this patent is extended or adjusted under 35 U.S.C. 154(b) by 340 days.

(21) Appl. No.: 14/208,952

(22) Filed: Mar. 13, 2014

(65) Prior Publication Data

US 2014/0275840 A1 Sep. 18, 2014

Related U.S. Application Data

(60) Provisional application No. 61/794,540, filed on Mar. 15, 2013.

(51) Int. Cl.
  *A61B 5/00* (2006.01)
  *A61B 5/0205* (2006.01)
  *A61B 5/11* (2006.01)

(52) U.S. Cl.
  CPC .......... *A61B 5/4094* (2013.01); *A61B 5/0205* (2013.01); *A61B 5/1118* (2013.01); *A61B 5/4866* (2013.01)

(58) Field of Classification Search
  CPC ................ A61B 5/4094; A61B 5/1118; A61B 5/0205; A61B 5/4866
  USPC ................................................. 600/301, 300
  See application file for complete search history.

(56) References Cited

U.S. PATENT DOCUMENTS

| | | | |
|---|---|---|---|
| 5,995,868 A * | 11/1999 | Dorfmeister | A61B 5/048 600/300 |
| 7,486,986 B1 * | 2/2009 | Osorio | A61B 5/076 600/378 |
| 7,643,881 B2 * | 1/2010 | Armstrong | A61B 5/01 600/549 |
| 2003/0195429 A1 * | 10/2003 | Wilson | A61B 5/4094 600/544 |
| 2008/0266118 A1 * | 10/2008 | Pierson | A61B 5/0205 340/573.6 |
| 2010/0121215 A1 * | 5/2010 | Giftakis | A61B 5/031 600/544 |
| 2010/0280335 A1 * | 11/2010 | Carlson | A61N 1/36082 600/595 |

(Continued)

*Primary Examiner* — Benjamin J Klein
*Assistant Examiner* — Vynn V Huh
(74) *Attorney, Agent, or Firm* — CF3; Stephen Eisenmann

(57) ABSTRACT

We report a method of detecting a pathological body state of a patient, comprising receiving a body signal of the patient; determining a BDV from said body signal; determining an activity level of said patient; determining a value range for said BDV for said patient, based at least in part on said activity level; comparing said BDV to said value range; and detecting a pathological state when said BDV is outside said value range. We also report a medical device system configured to implement the method. We also report a non-transitory computer readable program storage unit encoded with instructions that, when executed by a computer, perform the method.

7 Claims, 12 Drawing Sheets

(56) References Cited

U.S. PATENT DOCUMENTS

| | | | | |
|---|---|---|---|---|
| 2011/0245629 A1* | 10/2011 | Giftakis | ............... | A61B 5/742 |
| | | | | 600/301 |
| 2012/0083701 A1* | 4/2012 | Osorio | ............... | A61B 5/0402 |
| | | | | 600/483 |
| 2012/0277605 A1* | 11/2012 | Colborn | ............... | A61B 5/024 |
| | | | | 600/508 |
| 2013/0053652 A1* | 2/2013 | Cooner | ............... | A61B 5/369 |
| | | | | 600/595 |
| 2013/0096393 A1* | 4/2013 | Osorio | ............... | A61B 5/4094 |
| | | | | 600/300 |
| 2013/0116514 A1* | 5/2013 | Kroner | ............... | A61B 5/316 |
| | | | | 600/509 |
| 2014/0257115 A1* | 9/2014 | Katra | ............... | A61B 5/04 |
| | | | | 600/483 |

\* cited by examiner

PATHOLOGICAL STATE DETECTION USING DYNAMICALLY DETERMINED BODY DATA VARIABILITY RANGE VALUES

CROSS-REFERENCE TO RELATED APPLICATIONS

The present application claims the benefit under 35 U.S.C. § 119(e) of prior-filed co-pending provisional application No. 61/794,540, filed Mar. 15, 2013; the disclosure of which is hereby incorporated by reference.

FIELD OF THE DISCLOSURE

This disclosure relates to medical device systems and methods capable of detecting a pathological body state of a patient, which may include epileptic seizures, and responding to the same.

SUMMARY OF THE DISCLOSURE

In some embodiments, the present disclosure relates to a method of detecting a pathological body state of a patient, comprising receiving a body signal of the patient; determining a first body data variability (BDV) from said body signal; determining an activity level of said patient; determining a non-pathological range for said first BDV, based at least in part on said activity level; comparing said first BDV to said non-pathological range for said first BDV; and detecting a pathological body state when said BDV is outside said non-pathological range.

In some embodiments, the present disclosure relates to a method of determining a pathological state in a patient, comprising receiving data relating to an activity level of said patient; determining an activity level of the patient based on said data relating to an activity level; receiving at least one body signal of the patient; determining at least a first BDV based on said at least one body signal; dynamically determining a non-pathological range for said at least a first BDV based on said activity level; determining that the patient is in one of a non-pathological state and a pathological state, wherein said patient is determined to be in a non-pathological state if the at least a first BDV is within said non-pathological range, and said patient is determined to be in a pathological state if the at least a first BDV is outside said non-pathological range or is incommensurate for said patient with said activity type and level; and taking at least one further action based on determining that the patient is in a pathological state, wherein said further action is selected from treating said pathological state, issuing a warning to the patient or a caregiver regarding said pathological state, logging the occurrence of said pathological state, or logging a severity of said pathological state.

In other embodiments, the present disclosure relates to a medical device system comprising: at least one activity sensor, each said sensor configured to collect at least one activity signal from a patient; an activity level module configured to determine an activity level of said patient, based at least in part on said at least one activity signal; at least one sensor configured to sense a body signal; a current BDV module configured to determine at least a first BDV based on said sensed body signal; a BDV range determination module, configured to determine a non-pathological BDV range of said at least a first BDV, based at least in part on said activity type and level; and a state determination module, configured to determine that the patient is in one of a non-pathological state and a pathological state, wherein said patient is determined to be in a non-pathological state if the at least a first BDV is within said non-pathological BDV range for said at least a first BDV, and said patient is determined to be in a pathological state if the at least a first BDV is outside said non-pathological BDV range for said at least a first BDV.

In other embodiments, the present disclosure relates to a medical device system, comprising at least one metabolic sensor configured to collect at least one metabolic signal or respiratory signal relating to an activity level of said patient; an activity level module configured to determine an activity level of said patient based at least on part on said at least one metabolic or respiratory signal; at least one sensor configured to sense a body signal; a current BDV module configured to determine at least one BDV based on said sensed body signal; a BDV range determination module, configured to determine a non-pathological BDV range based at least in part on said activity level; and a module, configured to determine that the patient is in one of a non-pathological state and a pathological state, wherein said patient is determined to be in a non-pathological state if the first BDV is within said non-pathological BDV range, and said patient is determined to be in a pathological state if the first BDV is outside said non-pathological BDV range.

In some embodiments, the activity refers to physical activity (e.g., body movements), while in other embodiments, activity refers to cerebral activity (e.g., cognitive, emotional or other brain activity).

In some embodiments, the present disclosure relates to a non-transitory computer readable program storage unit encoded with instructions that, when executed by a computer, perform a method as described above.

BRIEF DESCRIPTION OF THE DRAWINGS

The disclosure may be understood by reference to the following description taken in conjunction with the accompanying drawings, in which like reference numerals identify like elements, and in which.

Figure 1:
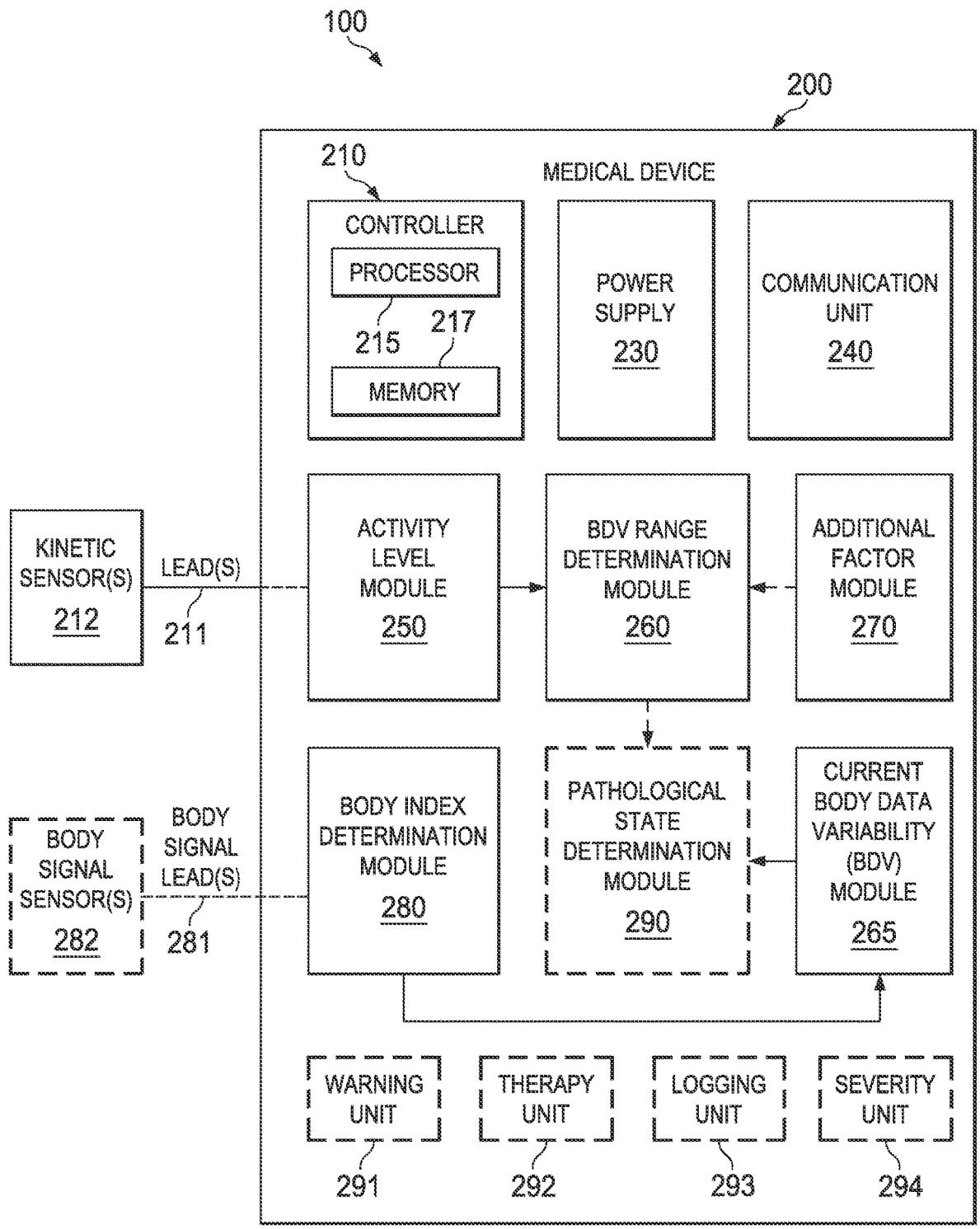
FIG. 1 shows a schematic representation of a medical device system, according to some embodiments of the present disclosure.

While the disclosure is susceptible to various modifications and alternative forms, specific embodiments thereof have been shown by way of example in the drawings and are herein described in detail. It should be understood, however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

DETAILED DESCRIPTION OF SPECIFIC EMBODIMENTS

Illustrative embodiments of the disclosure are described herein. For clarity, not all features of an actual implementation are described. In the development of any actual embodiment, numerous implementation-specific decisions must be made to achieve design-specific goals, which will vary from one implementation to another. Such a development effort, while possibly complex and time-consuming, would nevertheless be a routine undertaking for persons of ordinary skill in the art having the benefit of this disclosure.

Embodiments of the present disclosure provide for a medical device capable of monitoring an activity type and/or level of a patient and dynamically determining a non-pathological BDV range based upon an activity type and/or level of the patient. The dynamically determined BDV range may be used to classify a body system of the patient as being in a pathological or non-pathological state. An activity level or state (e.g., awake or asleep) of the patient may in some embodiments be determined from a kinetic sensor such as an accelerometer, while in other embodiments activity level may refer to a metabolic activity level as determined from a metabolic sensor measuring, e.g., glucose consumption, arterial and/or venous blood pH or differences thereof, or oxygen consumption. Kinetic sensors for use in embodiments herein may include any sensor that measures a kinetic activity of the patient, including movement, acceleration, velocity, position, force, or direction plus duration. The classification of body systems of the patient as pathological or non-pathological may further be based on health status, fitness level and prevailing environmental conditions (e.g., temperature, altitude, humidity, time of day, etc.) or patient characteristics (e.g., age, gender, BMI, fitness level, medications).

This disclosure recognizes that to determine (using body systems and their features) whether a body system is functioning pathologically or non-pathologically with a clinically worthwhile degree of accuracy and reliability, one must take into account the type and/or level of activity being performed by a subject at the time the pathological/non-pathological determination is made. For example, if the objective is to determine if and when a patient is in a seizure state that manifests with increases in heart rate, it is imperative to know whether or not a given increase in heart rate is associated with a change in activity (e.g., physical or emotional) and if such a change in activity is occurring, to determine if the heart rate increase is commensurate with said activity type and level. This may be accomplished by a dynamical adjustment of value ranges of body signal features to avoid false diagnoses.

In some embodiments, a non-pathological range for a BDV may be dynamically determined (which may include an adjustment to a previously determined non-pathological BDV range) based on the activity type and/or level of the patient. As used herein, the determination or adjustment may be considered to be "based on" the activity level so long as the determination of the non-pathological range takes into consideration the activity level, even though other factors (e.g., patient-specific or environmental factors) may also be used to determine the non-pathological range. In some embodiments, more than one BDV from at least one body signal may be determined, and corresponding non-pathological ranges for each of the body indices may be determined based on the activity type and/or level. Once the non-pathological body range is determined, a determination of a pathological or a non-pathological state of the patient may be made by comparing the patient's current BDV to the dynamically determined or adjusted non-pathological BDV range. In particular, the patient may be determined to be in a non-pathological state if the BDV is within the non-pathological BDV range, and the patient may be determined to be in a pathological state if the first BDV is outside the non-pathological BDV range. Where multiple body indices and corresponding non-pathological body ranges are determined, the determination of a pathological or non-pathological state may be based on more than one such index and range. When a detection of a pathological state is made, the medical device may perform a responsive action, such as issuing a notice of detection, providing a therapy, providing a warning, determining a severity of the pathological state, logging the determination of the pathological state, logging a time of occurrence of detection, logging a response to a therapy, and logging the severity of the pathological state.

In patients with disorders manifesting with body signals whose values are chronically in the pathologic range, the aforementioned distinction between pathological and non-pathological body signal value ranges no longer applies. In this case, variations within the pathologic range, lack of an expected variation or a paradoxical "jump" from the pathological to the non-pathological range value may indicate the occurrence of an event.

In some embodiments, the present disclosure relates to a method of determining a transition to or from a pathological state in a patient, comprising receiving data related to oscillations of arterial pressure and smooth muscle sympathetic nerve activity to determine if the patient is in a pathological state.

FIG. 1 shows a schematic representation of a medical device system, according to some embodiments of the present disclosure. The medical device system 100 may comprise a medical device 200, activity sensor(s) 212, lead(s) 211 coupling the activity sensor(s) 212 to the medical device 200, body signal sensors 282 and body signal leads 281 coupling body signal sensors 282 to medical device 200. The medical device system 100 may be fully or partially implanted, or alternatively may be fully external. In one embodiment, activity sensor(s) 212 may each be configured to collect at least one signal from a patient relating to an activity level of the patient. In some embodiments, the activity sensor 212 may be configured to sense physical, mental, and/or emotional activity. For example, each activity sensor 212 may be selected from an accelerometer, an inclinometer, a gyroscope, an ergometer, an electromyography (EMG) sensor, a body temperature sensor, an oxygen consumption sensor, a lactic acid accumulation sensor, a sweat sensor, a neurogram sensor, a force transducer, an ergometer, a responsiveness sensor, or an awareness sensor. Brain, metabolic or other sensors may be used in some embodiments. For example sensors (electrical, thermal, chemical, etc.) may be placed in one more structures (e.g., cortex, basal ganglia, cortico-spinal tract, or cerebellum) involved in motor control to determine the physical work performed by a person.

Various components of the medical device 200, such as controller 210, processor 215, memory 217, power supply 230, communication unit 240, warning unit 291, therapy unit 292, and logging unit 293 and severity unit 294 have been described in other patent applications assigned to Flint Hills Scientific, LLC or Cyberonics, Inc., such as, U.S. application Ser. No. 12/770,562, filed Apr. 29, 2010; U.S. application Ser. No. 12/771,727, filed Apr. 30, 2010; U.S. application Ser. No. 12/771,783, filed Apr. 30, 2010; U.S. application Ser. No. 12/884,051, filed Sep. 16, 2010; U.S. application Ser. No. 13/554,367, filed Jul. 20, 2012; U.S. application Ser. No. 13/554,694, filed Jul. 20, 2012; U.S. application Ser. No. 13/559,116, filed Jul. 26, 2012; and U.S. application Ser. No. 13/598,339, filed Aug. 29, 2012; U.S. application Ser. No. 12/896,525, filed Oct. 1, 2010, now U.S. Pat. No. 8,337,404, issued Dec. 25, 2012; U.S. application Ser. No. 13/098,262, filed Apr. 29, 2011; U.S. application Ser. No. 13/288,886, filed Nov. 3, 2011; U.S. application Ser. No. 13/554,367, filed Jul. 20, 2012; U.S. application Ser. No. 13/554,694, filed Jul. 20, 2012; U.S. application Ser. No. 13/559,116, filed Jul. 26, 2012; and U.S. application Ser. No. 13/678,339, filed Nov. 15, 2012. Each of the patent applications identified in this paragraph is hereby incorporated herein by reference.

The medical device 200 may comprise an activity level module 250, configured to determine an activity type and/or level of the patient, based at least in part on body signal data collected by activity sensor(s) 212. By "activity level" is meant the level of one or more of the patient's energy consumption (which may be termed "work level" and may conveniently be measured by proxies such as body movement, EMG activity, $O_2$ consumption or heart rate, among others, and from which the classical definition of work is not excluded), emotional activity (e.g., mild versus intense emotion), or cognitive activity (e.g., mild versus intense thinking) In some embodiments, information relating to work level may be collected by an accelerometer, etc., described above.

The activity level module 250 may determine an activity level of the patient at any sampling frequency for activity sensors 212. In one embodiment, the activity level module 250 is configured to determine the activity level with a sampling frequency ranging from about one thousand times per second to about once every four hours. The activity level module 250 may determine an activity level for at least one time window or may determine an instantaneous measure of activity. The at least one time window may be on a microscopic time scale (less than 10 min), a mesoscopic timescale (10 min.-24 hr.), or a macroscopic timescale (greater than 24 hr). Other temporal scales (smaller or larger) than those listed above may be applied. The medical device 200 may also comprise a BDV range determination module 260, configured to determine BDV ranges of the patient, based at least in part on the activity level determined by the activity level module 250. In some embodiments, the BDV range determination module 260 may determine a reference value range for a certain BDV (e.g., heart rate). In one embodiment, the BDV range determination module 260 may determine a non-pathological range for a particular BDV based on the activity level determined by the activity level module 250. By comparing an actual BDV (e.g., as determined from a BDV determined by a current BDV module 265, based on a body index determined by a body index determination module 280) to the reference value range (e.g., a non-pathological range), it is possible to determine whether the current BDV is in the non-pathological range or in a pathological range. Because of variations in pathological and non-pathological ranges associated with activity levels, a particular current BDV value may indicate that the patient is in a pathological state at one activity level but indicate that the patient is in a non-pathological state at another activity level. Thus, BDV range determination module 260 may determine that the same BDV value (e.g., the same heart rate) in the same patient is either pathological or non-pathological based on the activity level, activity type, or other variables (e.g., fitness level). In some embodiments, the BDV range determination module 260 may determine both a pathological range value and a non-pathological range value for the one or more body indices. By taking into account the effects on body indices of activity levels (e.g., mental activity, kinetic activity or metabolic activity), non-pathological ranges for particular indices derived from monitored body signals may be dynamically determined (which includes dynamic adjustment of the indices) so that detection of pathological states may be made with great accuracy. That is, false negative and false positive detections of pathological events may be reduced by dynamically determining pathological or non-pathological ranges for particular body indices based on activity type and level or other variables (e.g., environmental conditions).

In some embodiments, ranges determined by the BDV range determination module 260 may be based upon additional factors beside the activity level of the patient. For example, determination of a reference value range (e.g., a non-pathological BDV range or a pathological BDV range) may, in addition to the activity level of the patient, be based on data collected in real-time, and may include patient body data and/or environmental conditions that have an influence on the non-pathological BDV ranges. These actions may be performed with or without regard to the patient's body systems' status (normal or abnormal), and adjustments may be made to the boundaries of the non-pathological (or pathological) range so that a real-time BDV value may, in certain situations or circumstances, be indicative of a certain pathological state (e.g., epileptic seizure) and in others, not be indicative of the pathological state. In an adult with a resting heart rate of 110 bpm (indicative of dysfunction) who also suffers from epilepsy, seizures may further elevate the heart rate and said elevation in the context of no change in activity type or level, would be indicative of the occurrence of an epileptic seizure in said subject. That is, the collected body data may be a priori, normal or abnormal and if abnormal, the occurrence of a transient/reversible change in the state of a body system may further alter said abnormal activity.

In such embodiments, the additional factor(s) may be determined by an additional factor module 270 configured to determine one or more of a time of day, an environmental condition, a patient's body weight and height, a patient's body mass index, a patient's gender, a patient's age, an indicator of said patient's overall health, an indicator of said patient's overall fitness, or an indicator of said patient's level of consciousness, and provide an output relating to the additional factor determination. The BDV range determination module 260 may then be configured to determine a non-pathological BDV range based at least in part on the output of the additional factor module 270.

The BDV range determination module 260 may be configured to determine said reference value range (e.g., non-pathological or pathological BDV range) based at least in part on a kinetic signal collected from a time window ending at the current time. In some embodiments, the BDV range determination module 260 may perform calculations based upon a moving time window used to collect body signals.

In one embodiment, the BDV range determination module 260 may be configured to determine a non-pathological range for a first time based on the patient's activity in a first time window prior to said first time. The first time window may comprise a time interval ranging from 1 second to two hours. In one embodiment, the first time window may comprise one of: said first time and the preceding 1 second; said first time and the preceding 10 seconds; said first time and the preceding 30 second; said first time and the preceding 1 minute; said first time and the preceding 2 minutes; said first time and the preceding 3 minutes; said first time and the preceding 5 minutes; said first time and the preceding 10 minutes; said first time and the preceding 30 minutes; said first time and the preceding 1 hour; said first time and the preceding 2 hours. In some embodiments, the BDV range determination module 260 may also use the patient's historical health information to generate a non-pathological range for one or more body indices. Historical data of the patient may allow determination of changes in non-pathological ranges of the BDV during certain time periods.

The BDV range determination module 260 may make its determination at any sampling frequency or sampling rate. In one embodiment, the BDV range determination module 260 is configured to determine a non-pathological BDV range for a BDV (e.g., an instantaneous or average heart rate) at an update frequency ranging from about one thousand times per second to about once every four hours.

The medical device 200 may further comprise a body index determination module 280, configured to determine one or more body indices of the patient. The body index may be heart rate (instantaneous or in a short-term or long-term time window), heart rate rhythm, heart rate variability, blood pressure, blood pressure variability, respiratory rate, respiratory rhythm, respiratory rate variability, end tidal $CO_2$, kinetic activity, cognitive activity, dermal (including electrodermal) activity, chemical (including electro-chemical) activity, arterial pH, venous pH, arterial-venous pH difference, cortisol level, catecholamine level, or blood oxygen saturation, among others. The body index may be determined based on a signal collected from one or more body signal sensor(s) 282, which may be coupled to the medical device 200 by body signal lead(s) 281.

The medical device 200 may comprise a current BDV module 265 configured to determine at least one BDV. The current BDV module 265 may be configured to determine at least one body data variability selected from a heart rhythm variability, a heart rate variability (HRV), a respiratory rate variability (RRV), a blood pressure variability (BPV), a respiratory rhythm variability, respiratory sinus arrhythmia, end tidal $CO_2$ concentration variability, power variability at a certain neurological index frequency band (e.g., beta), an EKG morphology variability, a heart rate pattern variability, an electrodermal variability (e.g., a skin resistivity variability or a skin conductivity variability), a pupillary diameter variability, a blood oxygen saturation variability, a kinetic activity variability, a cognitive activity variability, arterial pH variability, venous pH variability, arterial-venous pH difference variability, a lactic acid concentration variability, a cortisol level variability, or a catecholamine level variability. The current BDV module 265 may be configured to determine the BDV from a body index determined by body index determination module 280. BDV may be expressed as a range of values [min-max], their variance or their standard deviation.

The medical device 200 may further comprise a pathological state determination module 290, configured to determine an occurrence of a pathological state of the patient, in response to the BDV being outside of a non-pathological range for the BDV for the prevailing activity type, level and other conditions. An occurrence of any pathological state that may be associated with a body signal outside a non-pathological BDV range provided by analysis of the patient's activity level may be determined by the pathological state occurrence module 290.

In patients whose baseline BDV range is abnormal, the occurrence of a seizure may manifest by an increase in BDV (i.e., the BDV value becomes even more abnormal), or in other cases, by the BDV decreasing into what generally among the patient population is the normal or non-pathological range. This latter concept may be referred to as "paradoxical normalization" For example, in an epilepsy patient also suffering from tachycardia, and having base resting heart rate of 100-110 bpm, a decline in heart rate to 70 bpm may be indicative of a seizure slowing down the heart rate, even though a heart rate of 70 bpm is generally "normal" across a typical population.

In one embodiment, the pathological state is an epileptic event, e.g., an epileptic seizure. For example, if the body signal is heart rate, then an instantaneous heart rate above the non-pathological heart rate range determined by the BDV range determination module 260 may indicate a tachycardia episode frequently seen with epileptic seizures originating from or spreading to certain brain regions, and an instantaneous heart rate below the non-pathological heart rate range may indicate a bradycardia episode occasionally seen with epileptic seizures originating from certain brain regions. By taking into account the activity level of the patient and other conditions, false positive and/or negative detections of pathological events may be avoided, since the effects of high or low activity levels upon heart rate may be used to adjust (e.g., raise, lower, widen or narrow) non-pathological or pathological heart rate ranges. For example, if the patient is engaged in vigorous exercise, the non-pathological range for heart rate may be increased and the range may be widened. If the patient is sedentary or sleeping, acceptable non-pathological ranges for heart rate may be lowered and narrowed.

Figure 2A:
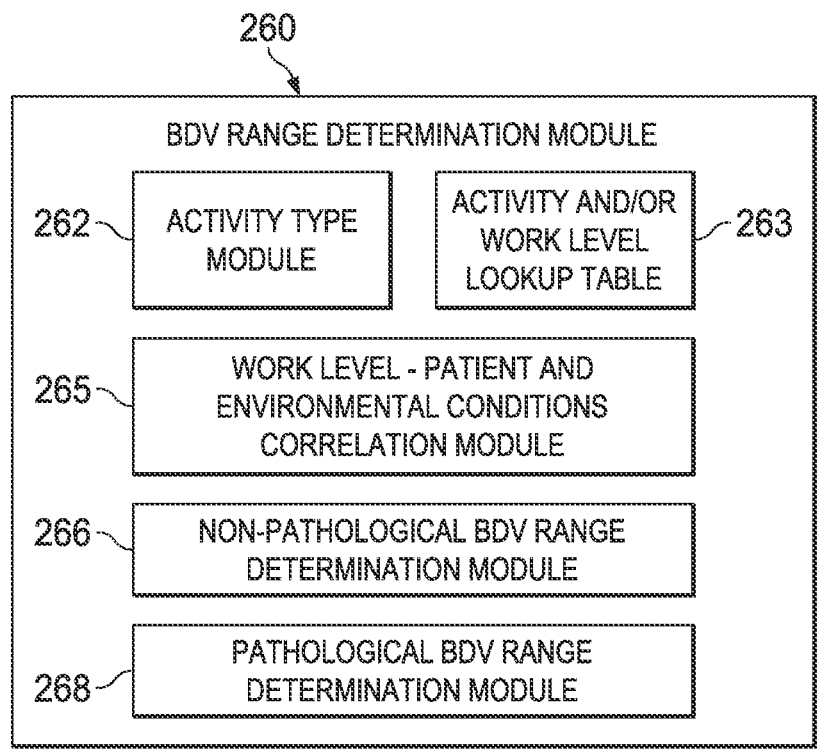
FIG. 2A shows a schematic representation of a BDV range determination module of the medical device system of FIG. 1, according to some embodiments of the present disclosure.

FIG. 2A shows a block diagram schematic representation of the BDV range determination module 260 in more detail, according to some embodiments of the present disclosure. The BDV range determination module 260 may comprise an activity module 262. The activity module 262 may be configured to determine source(s) (e.g., physical or cerebral), type(s) (e.g., jogging), or level (e.g., high) of the patient's activity.

The BDV range determination module 260 may comprise an activity and/or work level lookup table 263. The lookup table 263 may provide information relating a BDV range to an activity source, level, or type of the patient. In one embodiment, the activity or work level may refer to the metabolic changes in the patient's body based upon the amount of energy expended by the patient. However, other measures of activity or work level may be also used, including the classic reference to work level involving amount of force used, displacement, etc.

The BDV range determination module 260 may comprise a work-patient and environmental conditions correlation module 265. The work-patient and environmental conditions correlation module 265 may perform a correlation of information from the additional factor module 271 and the lookup table 263 to determine a non-pathological (or pathological) BDV range from the current patient and environmental conditions and current work being performed by the patient.

The BDV range determination module 260 may further comprise a non-pathological BDV range determination module 266. The non-pathological BDV range determination module 266 may determine the non-pathological BDV range from the patient's activity level for a given work level as determined by one or more of activity module 262, lookup table 263, or work-patient and environmental conditions module 265. In some embodiments, the BDV range determination module 260 may further comprise a pathological BDV range determination module 268, which may determine a pathological BDV range from by one or more of activity module 262, lookup table 263, or work-patient and environmental conditions module 265.

Figure 2B:
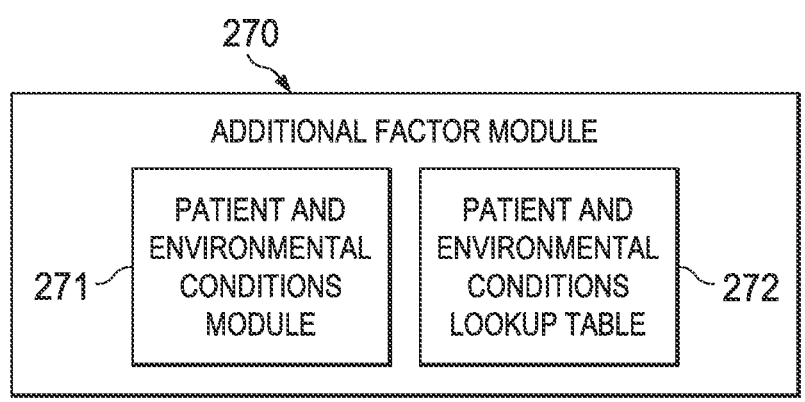
FIG. 2B shows a schematic representation of an additional factor module of the medical device system of FIG. 1, according to some embodiments of the present disclosure.

FIG. 2B shows a block diagram schematic representation of the additional factor module 270 in more detail, according to some embodiments of the present disclosure. Additional factor module 270 may comprise a patient and environmental conditions module 271. The patient and environmental conditions module 271 may be configured to provide a determination of one or more patient and environmental conditions. For example, the patient and environmental conditions module 271 may be configured to provide the time of day, such as by maintaining an internal clock, fetching a clock value from the processor 210, or requesting a time of day value from an external source via communication unit 240, among others. For another example, the patient and environmental conditions module 271 may be configured to provide the ambient temperature or the ambient humidity, altitude, such as by requesting the temperature from a thermometer, or the humidity from a hygrometer, in contact with ambient air. For additional examples, the patient and environmental conditions module 271 may be configured to provide the patient's body weight, the patient's BMI, or the patient's fitness level, among other factors.

The additional factor module 270 may comprise a patient and environmental conditions lookup table 272. The patient and environmental conditions lookup table 272 may provide information relating a non-pathological or pathological BDV range to patient and environmental conditions as determined by module 271. For example, if the BDV is heart rate, and the environmental condition is the time of day, a time of day between midnight and 6:00 AM may be related to a non-pathological heart rate range of 40-70 BPM, and this relation may be stored in patient and environmental conditions lookup table 272.

Figure 2C:
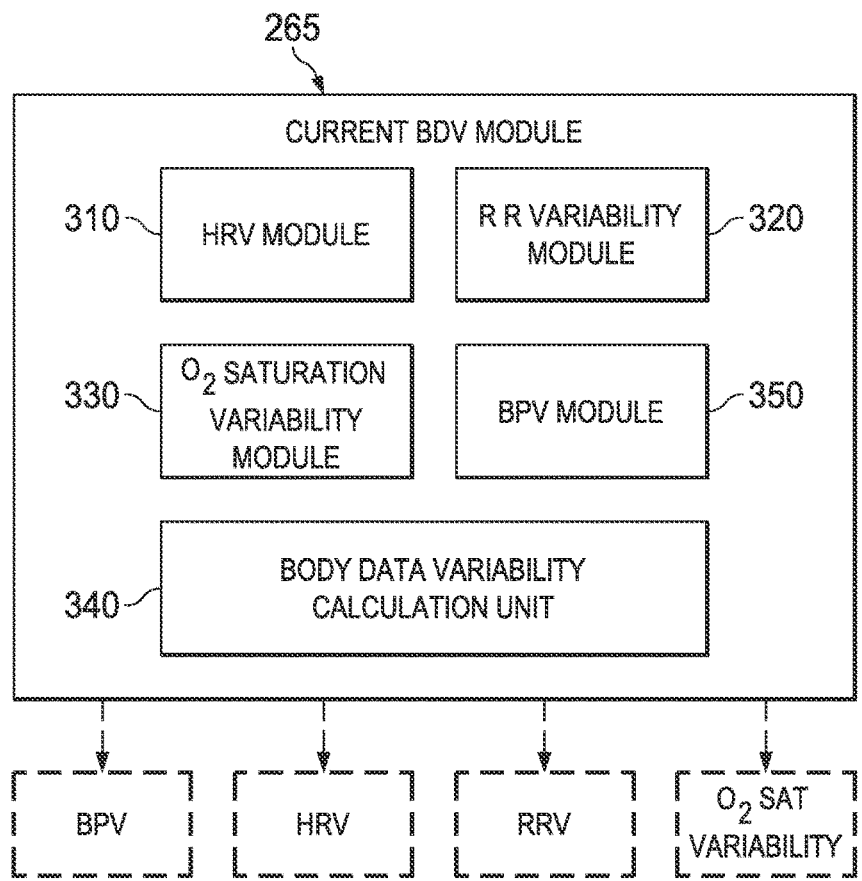
FIG. 2C shows a schematic representation of a current BDV module of the medical device system of FIG. 1, according to some embodiments of the present disclosure.

FIG. 2C shows a current BDV module 265. The current BDV module 265 may be configured to determine a BDV of one or more body data types. For example, the current BDV module 265 may comprise an HRV module 310 configured to determine HRV from heart rate data. For another example, the current BDV module 265 may comprise a respiratory rate variability (RRV) module 320 configured to determine RRV from respiratory rate data. For another example, the current BDV module 265 may comprise an $O_2$ saturation variability (O2SV) module 330 configured to determine O2SV from $O_2$ saturation data. For another example, the current BDV module 265 may comprise a blood pressure variability (BPV) module 350 configured to determine BPV from blood pressure data. Alternatively or in addition, the current BDV module 265 may comprise other modules configured to determine a variability of a particular body data type from that body data. Alternatively or in addition, the current BDV module 265 may determine a variability of a body data variability (e.g., a second derivative, a third derivative, etc., of the body data), and/or a variability at one or more activity levels. In some embodiments, the current BDV module 265 may calculate the underlying body data or changes therein.

The current BDV module 265 may also comprise a BDV calculation unit 340 configured to perform one or more calculations on one or more outputs of variability modules 310-330 and/or 350.

The current BDV module 265 may output one or more BDV values, such as an HRV value, an RRV value, a BPV value, or an O2SV value, among others.

Figure 3:
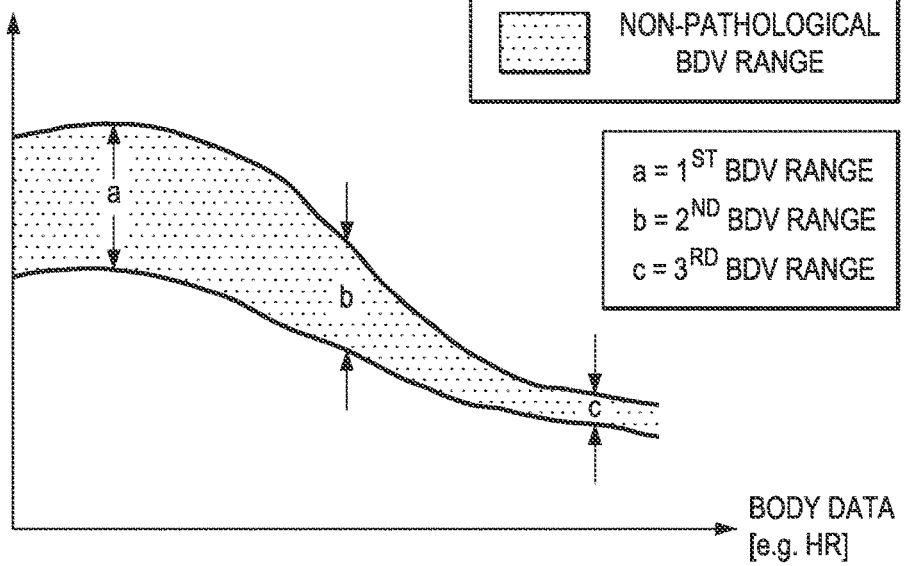
FIG. 3 shows the dynamic nature of an exemplary BDV range, according to some embodiments of the present disclosure.

FIG. 3 shows a dependence of a non-pathological BDV range (in this figure, heart rate variability (HRV)) on the value of the specified body data (in this figure, heart rate). Generally, as heart rate increases, going from zone a to zone b to zone c in the figure, the non-pathological HRV range decreases. An excursion of HRV outside the non-pathological HRV range may be taken as an indication of an occurrence of a pathological state, e.g., an epileptic seizure. This figure is for illustrative purposes, and is not necessarily reflective of body physiology.

Figure 4A:
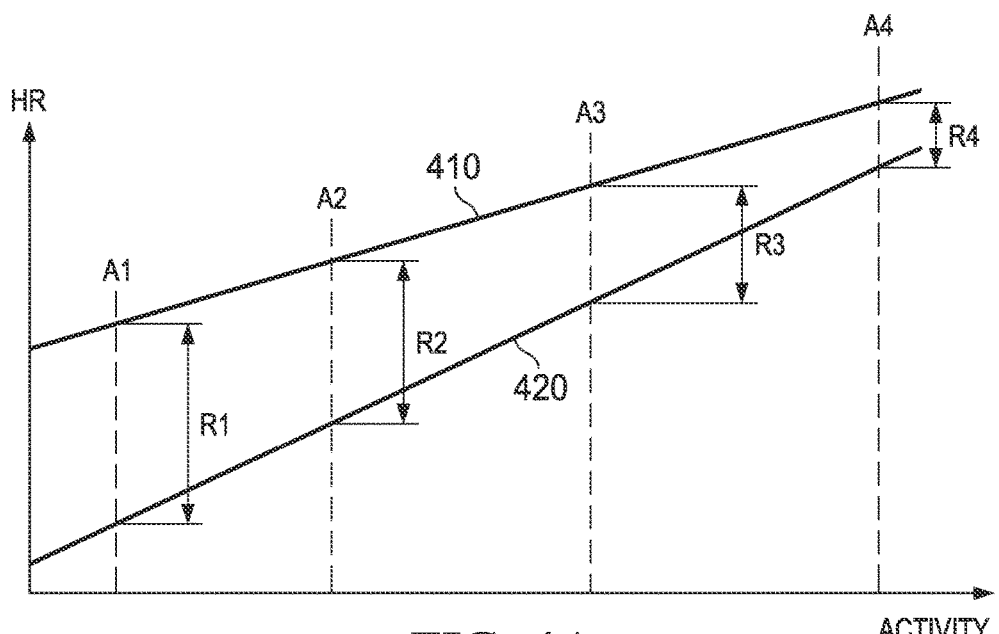
FIG. 4A shows the dynamic nature of an exemplary non-pathological heart rate variability (HRV) range, according to some embodiments of the present disclosure.
Figure 4B:
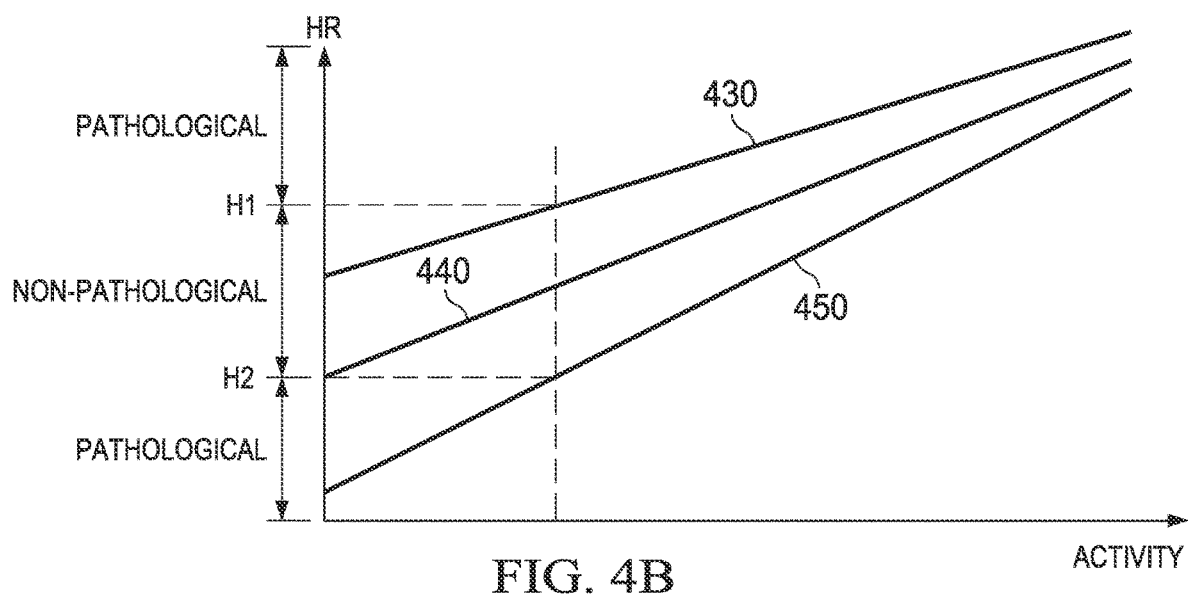
FIG. 4B shows the dynamic nature of an exemplary non-pathological HRV range in more detail, according to some embodiments of the present disclosure.

FIGS. 4A & 4B should not be used to exemplify the relation between activity, HR, and HRV, but are useful for illustrating HR variability as a function of activity level. Heart and respiratory rates vary as a function of activity/work level, but they also vary at rest and during sleep. FIG. 4A shows a dynamic relationship between non-pathological patient activity levels (e.g., as determined from a tri-axial accelerometer) and an exemplary body data and BDV (e.g., heart rate and HRV). The patient's activity level is shown on the x-axis, HR is on the y-axis, and HRV is represented by bars R1-R4. Although non-pathological activity level is shown in FIG. 4A as a single continuous parameter, a plurality of discrete activity levels or states may also be used to correlate HRV (or another BDV) to activity levels in some embodiments of the disclosure. Because HRV is a non-stationary parameter that may be influenced by many different factors in addition to activity levels (e.g., the patient's age, sex, body mass index, fitness level, hydration status, environmental conditions such as temperature, humidity, etc.) a particular activity level may result in a short-term HRV anywhere within the associated non-pathological HRV range.

FIG. 4A shows an activity-based, non-pathological heart rate range region bounded by upper non-pathological HR boundary line 410 and lower non-pathological HR boundary line 420. Both the upper and lower bounds of the non-ictal HR region increase as activity level increases (e.g., from a sleep state to a resting, awake state) and reach their highest values for strenuous exertion. In addition, the width of the non-pathological HR ranges narrows as activity levels and heart rates increase, which is consistent with the known reduction in HRV at high levels of exertion. When the patient is in a non-pathological state (e.g., when an epileptic patient is not having a seizure), for a particular activity level the patient's HRV should fall within a non-pathological HRV range associated with that activity level. Referring to FIG. 4A, at a particular activity level A1—corresponding to a sleeping activity level—a non-pathological HRV range R1 may be determined between upper and lower boundaries 410 and 420. Another non-pathological HRV range R2 may be established by upper and lower boundaries 410 and 420 for resting awake activity level A2. At activity levels A3 and A4, corresponding to moderate and strenuous exercise, respectively, corresponding non-pathological HRV ranges R3 and R4 may be determined from upper boundary 410 and lower boundary 420. As noted, the width of the non-pathological HRV ranges decrease as activity levels increase, and thus R1>R2>R3>R4.

Referring to FIG. 4B, non-pathological HRV ranges as a function of activity level are determined by upper and lower boundaries 430, 450 of heart rate. For a particular activity level A5, the non-pathological range of HRV lies between H1 and H2. If the HR is above H1 or below H2, the patient's HRV may be pathologically high (e.g., when the patient is having a seizure characterized by elevated heart rate, for which the non-pathological HRV range is narrow).

Upper and lower non-pathological HR boundaries 430, 450 may be determined from patient population data and stored in a memory of an implantable or body-worn medical device. When needed, the HR data or HRV data may be retrieved from the memory for use by the medical device to determine whether the patient's HRV is within a non-pathological range appropriate in view of the patient's activity level. Alternatively, HRV ranges may be determined by calculation from a formula based on the patient's activity level and/or heart rate, which may optionally take into account one or more additional factors such as those previously mentioned.

Upper and lower boundaries 430, 450 may alternatively be determined empirically from patient-specific data collected over time for a variety of activity levels. For example, the patient may be subjected to one or more stress tests such as a walking test on a treadmill, with HRs determined at each of a variety of different activity levels (e.g., as determined from one or more of a three-dimensional accelerometer, an electromyogram, gyroscope, and/or imaging devices such as a camera). Other activity level tests may be performed to determine upper and lower boundaries 430, 450. In one embodiment, upper non-pathological boundary 430 may be determined as an upper percentile value (e.g., the $90^{th}$, $95^{th}$, or $99^{th}$ percentile) of the non-pathological HRs measured at times corresponding to the particular activity level. Thus, a linear or higher-order polynomial may be fitted through the target upper percentile values over a range of activity levels to obtain the upper boundary 430. Similarly, another polynomial may be fitted through a target percentile value (e.g., $5^{th}$, $2^{nd}$, $1^{st}$) to obtain the lower boundary 450.

Additional curves may be determined by fitting polynomials to additional target percentile values of the activity level/HR/HRV data. Referring again to FIG. 4B, a median boundary line 440 may be determined by fitting a polynomial through the $50^{th}$ percentile values over the range of activity levels. Additional percentile values may be determined similarly. In addition, the overall range may be further divided into sub-ranges (e.g., first, second, third and fourth quartile ranges).

In some embodiments of the present disclosure, upper and lower boundaries may be determined for one or more specific types of pathological states. For example, separate upper and lower HR boundaries as a function of activity level may be determined for simple partial seizures, complex partial seizures, or generalized tonic-clonic seizures, among others. Without being bound by theory, these upper and lower boundaries for each seizure type may be determined as specific percentile value curves from those described immediately above. For example, in one embodiment a non-pathological boundary for a simple partial seizure may be determined as a $90^{th}$ percentile value for a particular activity level, while a non-pathological boundary for a complex partial seizure may be determined as a $95^{th}$ percentile value for a particular activity level. From the one or more upper and lower HR boundaries, corresponding non-pathological HRV ranges may be determined.

In some embodiments, upper and lower boundaries for simple partial and complex partial seizures may be determined by activity levels and the results of an awareness test. Where the awareness test indicates that the patient has not lost awareness, the HRs measured while the patient remains aware may be used (along with activity levels) as data to determine upper and lower HR boundaries (and corresponding non-pathological HRV ranges) for simple partial seizures. When and if the patient loses awareness, the data of HR and activity level may be used to determine upper and lower activity level HR boundaries for seizures associated with loss of function, such as complex partial, complex partial with secondary generalization, or generalized seizures.

FIGS. 4A and 4B together show that a non-pathological HRV (or other BDV) range may be established for a given activity level of the patient. In some embodiments, the range may be a unique range based on historical data for the patient, while in other embodiments data for patient populations may be used, at least until patient-specific data can be obtained. For simplicity, FIGS. 4A and 4B depict the upper and lower boundaries as being linear. It will be appreciated, however, that the boundaries for an actual patient would not necessarily be linear, particularly where additional factors may be considered.

The dynamic relationship between non-pathological HRVs and activity levels may be exploited to detect pathological states such as epileptic seizures by determining when the patient's HRV is incommensurate with the patient's activity level and/or heart rate. By monitoring the patient's activity level, HR, and HRV, it is possible to determine when the patient's HRV falls outside the non-pathological ranges as the patient's activity levels change over time.

Figure 5:
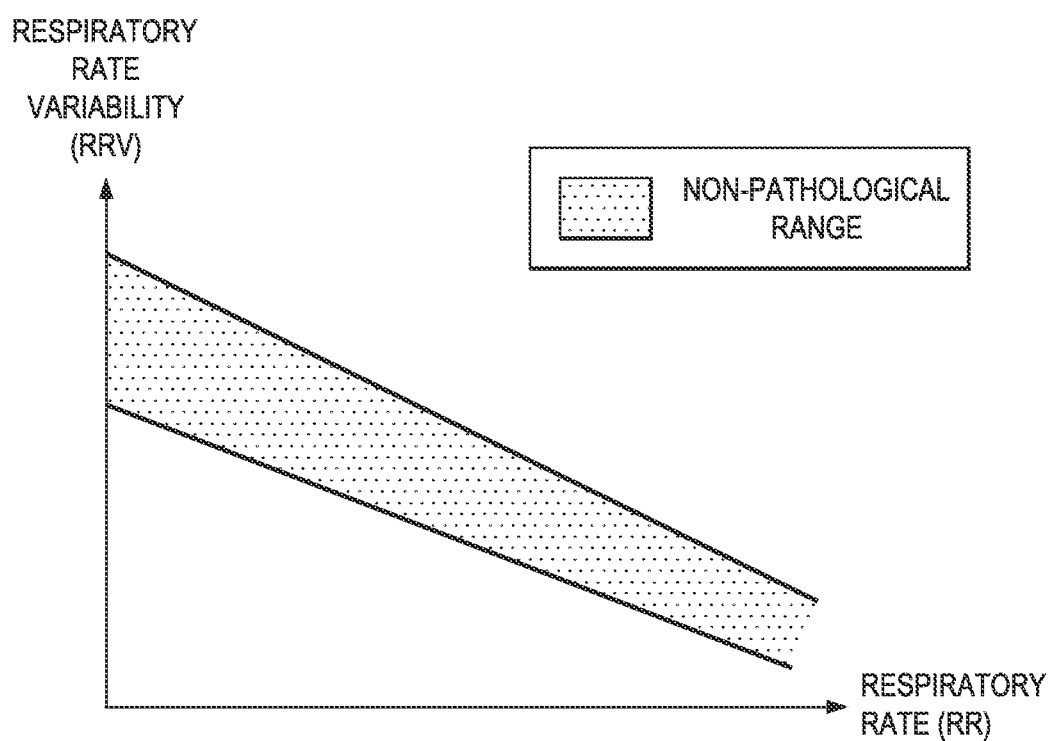
FIG. 5 shows the dynamic nature of an exemplary non-pathological respiratory rate variability range, according to some embodiments of the present disclosure.

FIG. 5 shows the dependence of non-pathological RRV range on respiratory rate. Generally, RRV is highest at low respiratory rate (RR) and lowest at high RR. An excursion of RRV outside the non-pathological RRV range may be taken as an indication of an occurrence of a pathological state, e.g., an epileptic seizure. This figure is for illustrative purposes, and is not necessarily reflective of body physiology.

Although FIGS. 3-4 are directed to HRV and a non-ictal range thereof, and FIG. 5 to RRV and a non-pathological range thereof, analogous non-pathological ranges may be determined for BPV, dermal activity variability, O2SV, or neurologic activity variability, among others. As with HRV, such other BDVs may also be expected to vary with time of day, activity level, or other parameters. Also, disorders other than epilepsy would be expected to have non-pathological ranges of one or more of these BDVs.

Figure 6:
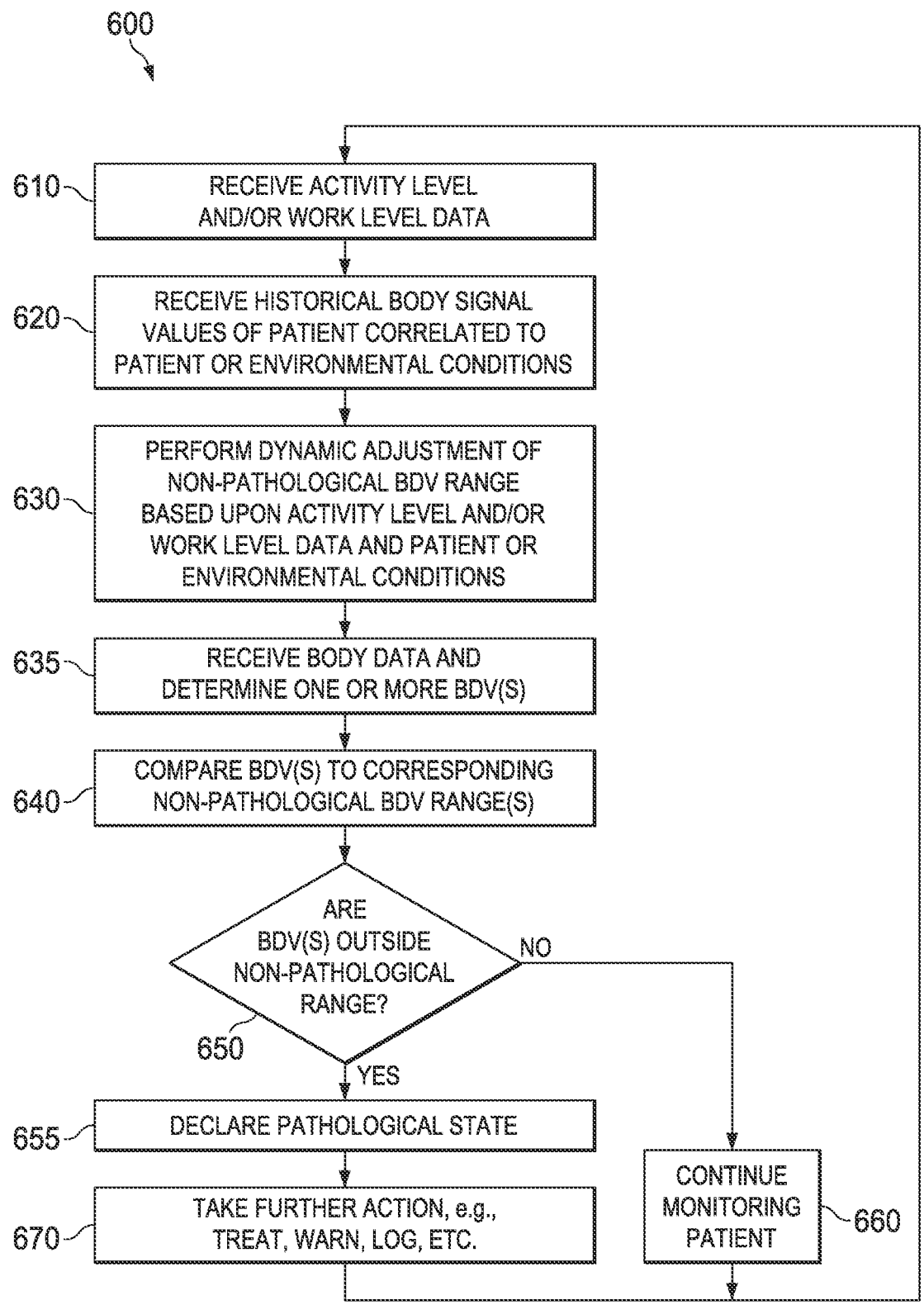
FIG. 6 shows a flowchart representation of a method, according to some embodiments of the present disclosure.

FIG. 6 shows a flowchart representation of a method 600, according to some embodiments of the present disclosure.

The method 600 may comprise receiving activity level and/or work level data at 610. The method 600 may, in some embodiments, also comprise receiving at 620 historical body signal values related to one or more patient state or environmental conditions.

The method 600 may comprise dynamically adjusting at 630 a non-pathological BDV range based at least in part on one or more of activity level and/or work level data, patient state, and/or environmental conditions. In some embodiments, the non-pathological BDV range may be adjusted by updating either or both of the lower or upper bounds of the range, or selecting the range from a lookup table or bank of ranges.

The method also comprises receiving body data and determining one or more BDV(s) at 635. The one or more BDV(s) correspond to the BDV(s) for which non-pathological (or pathological) ranges have been determined at 630. The BDV(s) may be compared at 640 to the dynamically adjusted non-pathological BDV ranges. If the patient is found at 650 to be in a pathological state, e.g., if the patient's BDV is outside the non-pathological BDV range (or if the reference non-pathological values are incommensurate for the activity type, activity level, work level, patient state, and/or environmental conditions), the method 600 may comprise declaring a pathological state (at 655) and/or at least one further action taken at 670, e.g., treating the pathological state, issuing a warning to the patient or a caregiver regarding the pathological state, logging the occurrence and/or the severity of the pathological state, etc., In one embodiment, the severity may be measured by a magnitude and/or duration of a pathological state such as a seizure, a type of autonomic change associated with the pathological state (e.g., changes in heart rate, breathing rate, brain electrical activity, the emergence of one or more cardiac arrhythmias, etc.). If the patient is found at 650 to not be in a pathological state, the method 600 may comprise continued monitoring of the patient at 660. In either event, after the further action(s) taken at 670 or the continued monitoring at 660, flow may return to receiving activity level data at 610.

Figure 7:
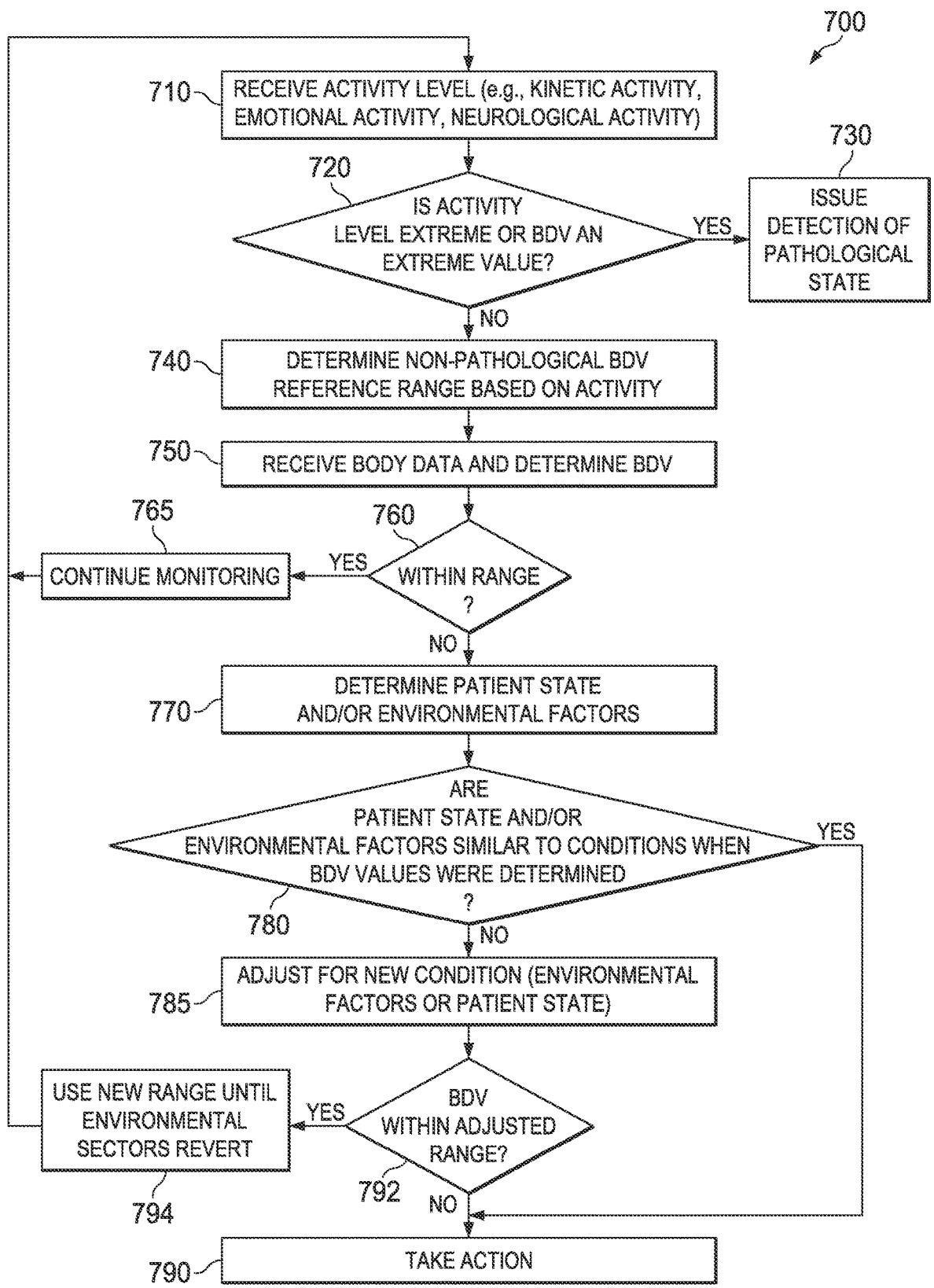
FIG. 7 shows a flowchart representation of a method, according to some embodiments of the present disclosure.

FIG. 7 shows a flowchart representation of a method 700 for determining if a BDV is indicative of a pathological state, according to one embodiment of the disclosure. The non-pathological range for the at least one BDV may be based upon work level data, patient state, and/or environmental conditions, according to some embodiments. First, activity level data may be received at 710. This received data may be related to the origin(s), type, or magnitude of the activity, i.e., may provide a qualitative, semi-quantitative, or quantitative measure of the kinetic, emotional, and/or cognitive contributions to the patient's activity level.

It may then be determined at 720 whether the activity level is extreme or the BDV has an extreme value (e.g., 3SD above or below the mean). If the activity level and/or the BDSV are extreme (i.e., if it is higher or lower than is possible for volitional patient physical activity), a detection of a pathological state (e.g., an epileptic seizure) may be issued at 730. If the activity level is not extreme, a non-pathological reference range (e.g., a non-ictal heart rate range) for the at least one BDV may be determined at 740, based on the patient's activity. The determination at 740 may, but need not, comprise a lookup of reference ranges found for various activities at a set of prior patient state and/or environmental factor conditions. For example, the prior conditions may be initial patient state and/or environmental factor conditions, such as a set of such initial conditions determined at an initial patient workup, among other possible prior conditions. Body data of the patient may then be received, and a change in the at least one BDV may be determined, at 750.

From the non-pathological BDV reference range(s) and the at least one BDV corresponding thereto, it may be determined at 760 whether the at least one BDV is within the non-pathological range. If it is within the non-pathological range, but incommensurate with the activity or work level, a detection of a pathological state may be issued and at least one responsive action taken (at 790). If the BDV is within the non-pathological range and commensurate with the work/activity level, monitoring may be continued (at 765), which may comprise returning to receiving the activity level data at 710. If it is outside the non-pathological range, then it may be that a pathological state has occurred; however, the possibility exists that the current patient state and/or current environmental factors have changed so much from the conditions under which the BDV reference values were determined that the reference range determined at 740 is no longer suitable.

To address the latter possibility, patient state and/or environmental factors may be determined at 770, and a determination made at 780 whether the patient state and/or environmental factors are similar to those prevailing when the BDV values were determined. If the patient state and/or environmental factors are similar, then the reference range determined at 740 should still be applicable, and a pathological state is indicated. Therefore, an action (such as issuing a detection of the pathological state, logging the pathological state, treating the pathological state, and/or warning the patient or a caregiver of the pathological state) may be taken at 790. If the patient state and/or environmental factors are not similar, then the non-pathological BDV reference range may be adjusted at 785 in view of at least one patient state and/or environmental condition. The direction, magnitude, and/or other properties of the adjustment to the reference range may depend upon the sensitivity of the particular BDV to the patient or environmental factor(s) being considered.

The adjusted non-pathological BDV reference range may then be used in a determination at 792 whether the current BDV is within the adjusted range. If it is not, a pathological state is indicated, and an action may be taken at 790. If the BDV is within the adjusted range, then (at 794, with flow returning to 710) the adjusted range may be used until patient state and/or environmental conditions revert or change (e.g., chart flow passes once more through blocks 760, 770, and 780).

Figure 8:
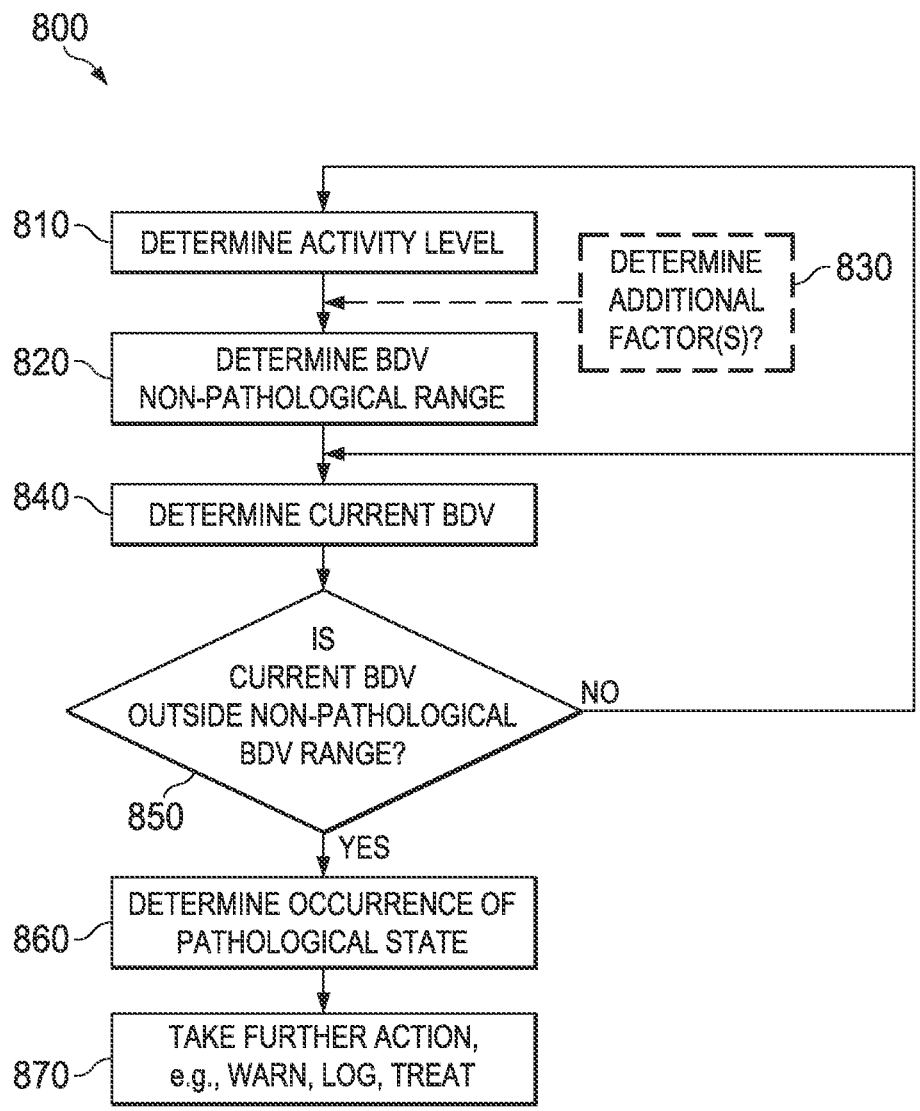
FIG. 8 shows a flowchart representation of a method, according to some embodiments of the present disclosure.

FIG. 8 shows a flowchart representation of a method 800 of determining if the patient is in a pathological or a non-pathological state. First, an activity level of the patient may be determined at 810, and a non-pathological BDV range may be determined at 820, based at least in part on the activity level. In some embodiments, one or more additional factors may be determined and the non-pathological BDV range may be determined at 830, based at least in part on the additional factor(s) and/or the activity level. Examples of such additional factors include, but are not limited to, those described supra.

After the non-pathological BDV range is determined at 820, a BDV value of the patient may be determined at 840. In some embodiments, multiple body indices may be determined, to increase the specificity and sensitivity of distinguishing between pathological and non-pathological states. If the BDV value is determined at 850 to be outside the non-pathological BDV range, then it may be determined at 860 that a pathological state of the patient has occurred.

Thereafter, a further action, such as warning, treating, or logging the occurrence and/or the severity of the pathological state, may be taken at 870. If the BDV value is found at 850 to be within the non-pathological BDV range, then flow may return to any of determining the BDV value at 840, determining the non-pathological BDV range at 820, or determining the activity level at 810.

Though not shown in FIG. 8, in certain embodiments of the method 800, a second BDV value may be determined, either from the same body index/indices as the first BDV value, or from (a) different body index/indices. A non-pathological range for the second BDV may be determined, analogously to that described above at 820. In some embodiments, the pathological state detection at 850 may be based on whether both the first and second BDVs are both outside their respective non-pathological ranges. As should be apparent to the person of ordinary skill in the art having the benefit of the present disclosure, a third, fourth, . . . nth BDV may also be determined and used in performance of the method.

Also not shown in FIG. 8, in certain embodiments of the method 800, a body index value may be determined, a non-pathological range thereof may be determined, and a pathological state detection may be partially based on whether the body index value is outside its non-pathological range. In one embodiment, the body index value may be the value of the body index from which the BDV value is determined. For example, the body index value may be heart rate and the BDV value may be HRV.

Figure 9:
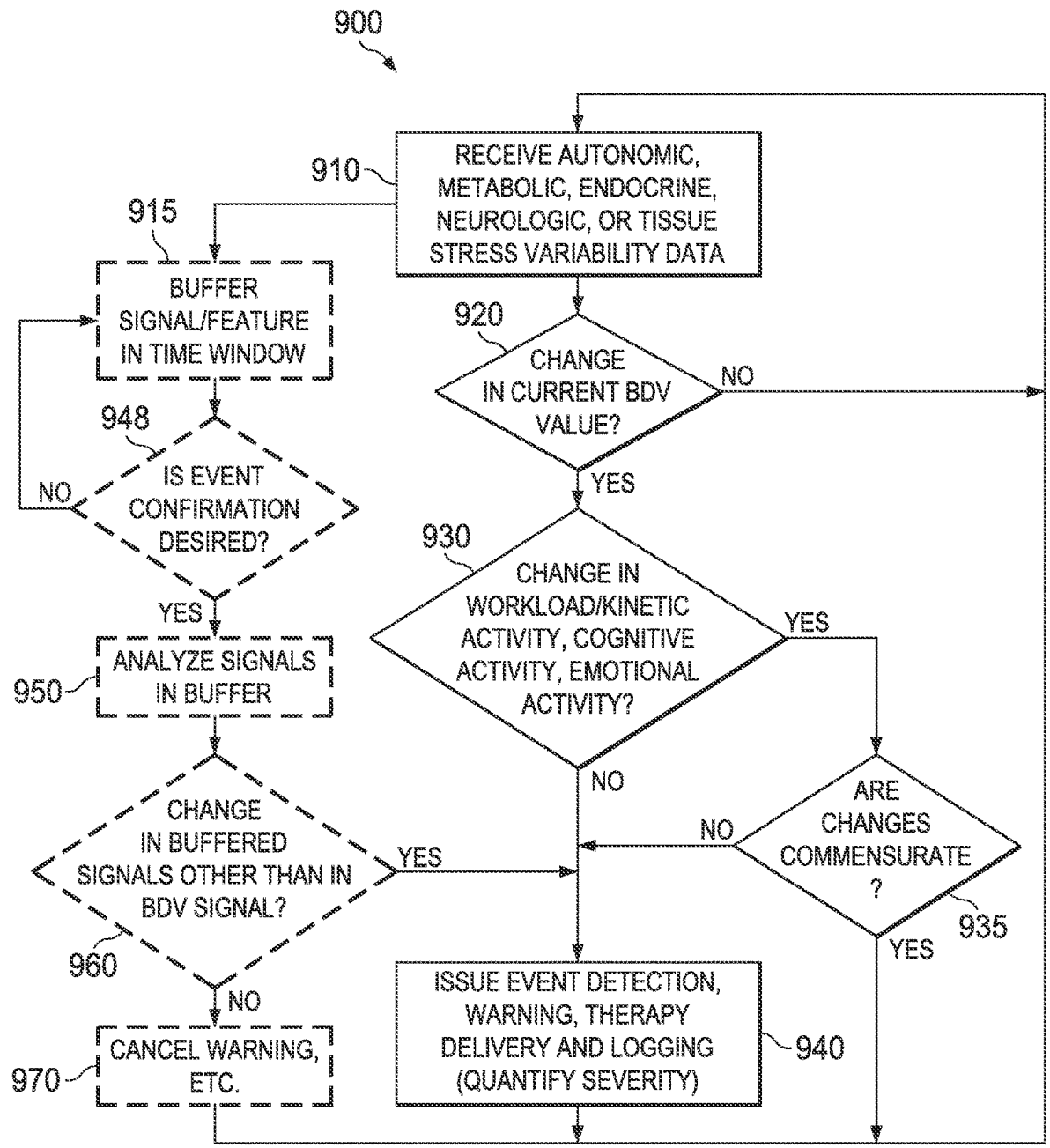
FIG. 9 shows a flowchart representation of a method, according to some embodiments of the present disclosure.

FIG. 9 shows a flowchart representation of a method 900, according to some embodiments of the present disclosure. One or more body signal variability data streams, such as autonomic, metabolic, endocrine, neurologic, or tissue stress variability data, may be received at 910. Optionally, in some embodiments, a different body signal and/or a different feature of the same body signal(s) from a first time window may be buffered at 915. The body signal(s) or features buffered at 915 may be the same or different from the first BDV referred to below. The buffered signals may be useful in various optional embodiments, such as confirmation of a pathological state detection or the like, as will be discussed below.

A determination may be made at 920 whether the value of the current BDV (as received at 910) has changed. If the current BDV is unchanged (i.e., is the same or has only insubstantial differences to prior value(s)), then flow may return to receiving at 910. If the current BDV has changed, it may then be determined at 930 whether a change in the patient's activity level, e.g., work load, kinetic activity, cognitive activity, or emotional activity has occurred.

If the determination at 930 is that the patient's activity level is unchanged, the change in BDV in the absence of a change in activity may be suggestive of an occurrence of a pathological state, e.g., an epileptic seizure. Thus, the method 900 may comprise taking one or more actions at 940, such as issuing a pathological state (e.g., an epileptic seizure) detection, issuing a warning of the pathological state, delivering a therapy for the pathological state to the patient, or logging the pathological state or the severity thereof.

On the other hand, if the determination at 930 is that the patient's activity level has changed, it may still be the case that a pathological state has occurred. Thus, the method 900 may comprise determining at 935 whether the change in current BDV and the change in activity are commensurate. If they are not, then a pathological state may have occurred, and the one or more actions described above may be taken at 940. On the other hand, if the changes are commensurate, then flow may return to receiving at 910.

If confirmation of a pathological state event detection is desired then analysis of the body signals, if any, buffered at 915 may begin (element 950).

The analysis at 950 may indicate whether there is a change in one or more buffered body signals/features other than the first BDV. If it is determined at 960 that no change has occurred in other body signals/features that would be expected to change with the pathological state, then any previously taken action, e.g., those which may have been taken at 940, such as issuing a pathological state detection, issuing a warning of the pathological state, delivering a therapy for the pathological state to the patient, or logging the pathological state or the severity thereof, may have been taken in error. In light thereof, the detection, the warning, etc., may be canceled, etc., at 970 and this information logged for future reference.

However, if the determination at 960 indicates a change in the buffered body signals/features expected for the pathological state has occurred, i.e., that a pathological state identified in the manner described above is confirmed then a responsive action may be taken at 940.

Figure 10:
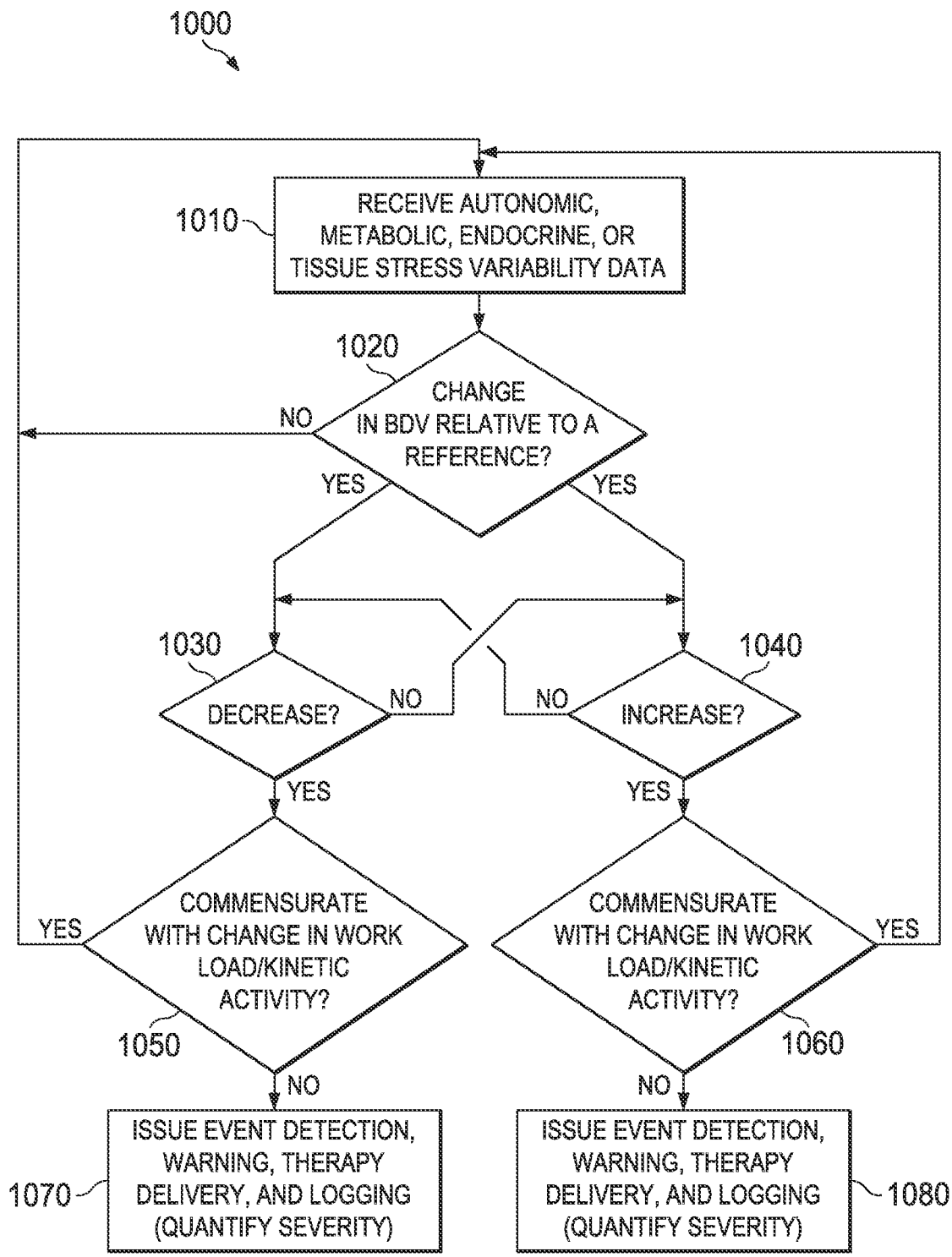
FIG. 10 shows a flowchart representation of a method, according to some embodiments of the present disclosure.

FIG. 10 shows a flowchart representation of a method 1000, according to some embodiments of the present disclosure. One or more body signals, such as autonomic, metabolic, endocrine, or tissue stress variability data, may be received at 1010. A determination may be made at 1020 whether the value of a first BDV has changed. If said first BDV is unchanged (i.e., is the same or has only insubstantial differences to prior value(s)), then flow returns to receiving at 1010.

If the value of the first BDV has changed, then it may be determined whether the BDV value has decreased (at 1030) or increased (at 1040). If both element 1030 and element 1040 indicate the BDV value has neither decreased nor increased, then flow may return to receiving at 1010. If one or the other of elements 1040 and 1030 indicate the BDV value has increased or decreased, then a determination may be made at 1050 or 1060 whether the increase or decrease is commensurate with the patient's activity level or a change thereof.

From either determination at 1050 or 1060, if the change is commensurate with the patient's activity level and/or a change in activity level, then flow may return to receiving at 1010. If the change is not commensurate with the patient's activity level or change in activity level, then one or more actions may be taken at 1070 or 1080, such as issuing a pathological state (e.g., an epileptic seizure) detection, issuing a warning of the pathological state, delivering a therapy for the pathological state to the patient, or logging the pathological state or the severity thereof. It may be the case that a pathological state detected at 1070 (arising from a body signal value decrease not commensurate with a change in the patient's activity level or a change thereof) may be different from one detected at 1080. In other words, decreases or increases in one or more of autonomic, metabolic, endocrine, or tissue stress variability data may be greater or lesser than expected from the patient's activity level, and a granularity of outputs between elements 1070 and 1080 may exist.

Figure 11:
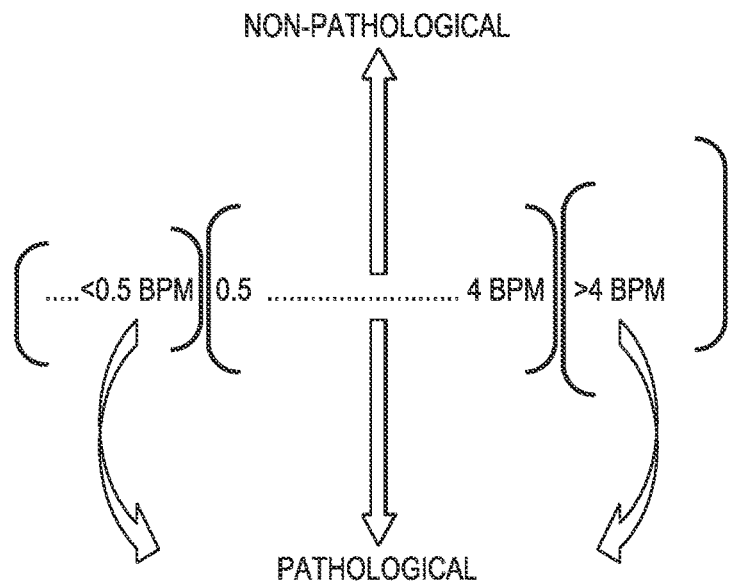
FIG. 11 shows a conceptual depiction of pathological and non-pathological BDV (e.g., HRV) ranges, according to some embodiments of the present disclosure.

FIG. 11 shows a conceptual depiction of pathological and non-pathological BDV (e.g., HRV) value ranges. Certain HRV ranges, such as below 0.5 bpm and above 4 bpm, are essentially always pathological when seen in patients having normal levels of physical fitness and either resting or engaged in mild activity (e.g., walking). Intermediate HRV ranges, such as from 0.5-4 bpm, may be pathological, or may be non-pathological, depending on the kinetic and/or emotional/cognitive activity levels of the patient. In other words, HRV values that are non-pathological or physiologic for certain activity levels may be indicative of a pathological change (e.g., a seizure) for other activity levels.

Figure 12:
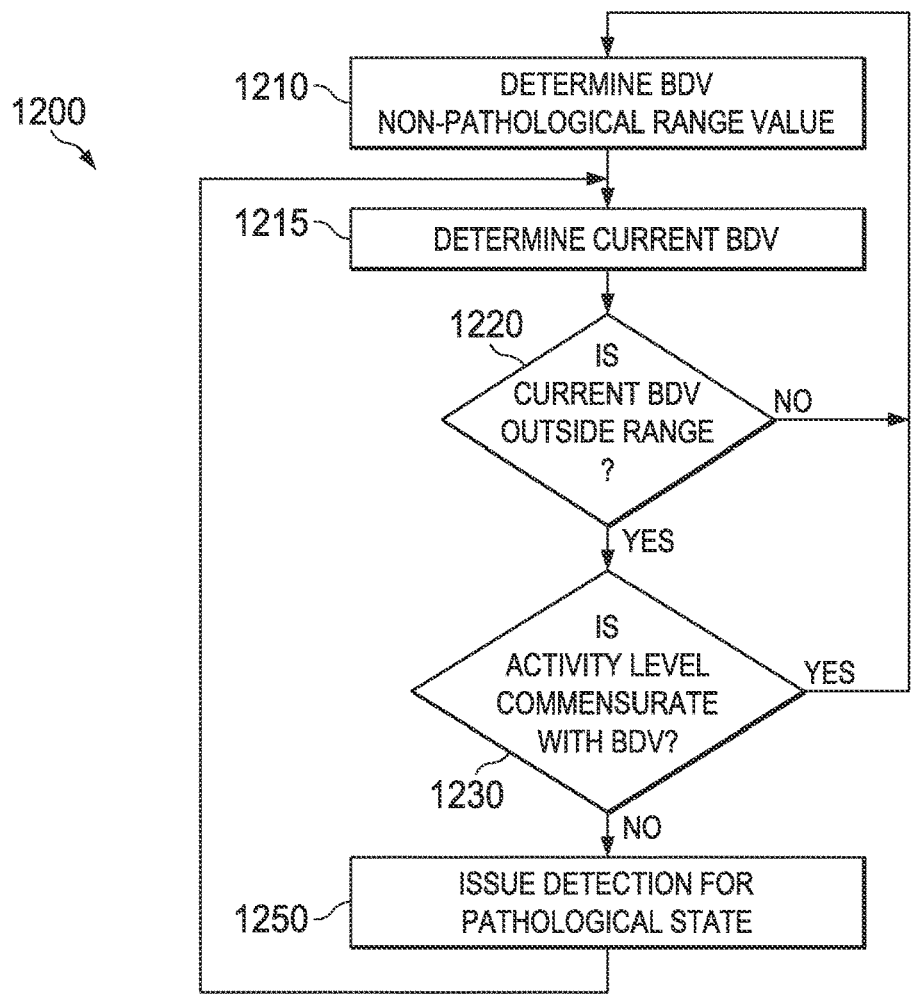
FIG. 12 shows a flowchart representation of a method, according to some embodiments of the present disclosure.

FIG. 12 shows a flowchart representation of a method 1200, according to some embodiments of the present disclosure. A non-pathological BDV range value may be determined (e.g., from patient data, and taken into account an assumed activity level of the patient) at 1210, and a current BDV may be determined at 1215. If the BDV value is found to be inside the non-pathological range at 1220, flow returns to 1210. If the BDV value is found to be outside the range at 1220, then a determination may be made at 1230 whether the patient's activity level is commensurate with the BDV. If the activity level is commensurate, then the non-pathological BDV range may be (re)determined at 1210. If the activity level is not commensurate with the current BDV, then a detection of a pathological state may be issued at 1250, with flow then returning to 1215.

Figure 13:
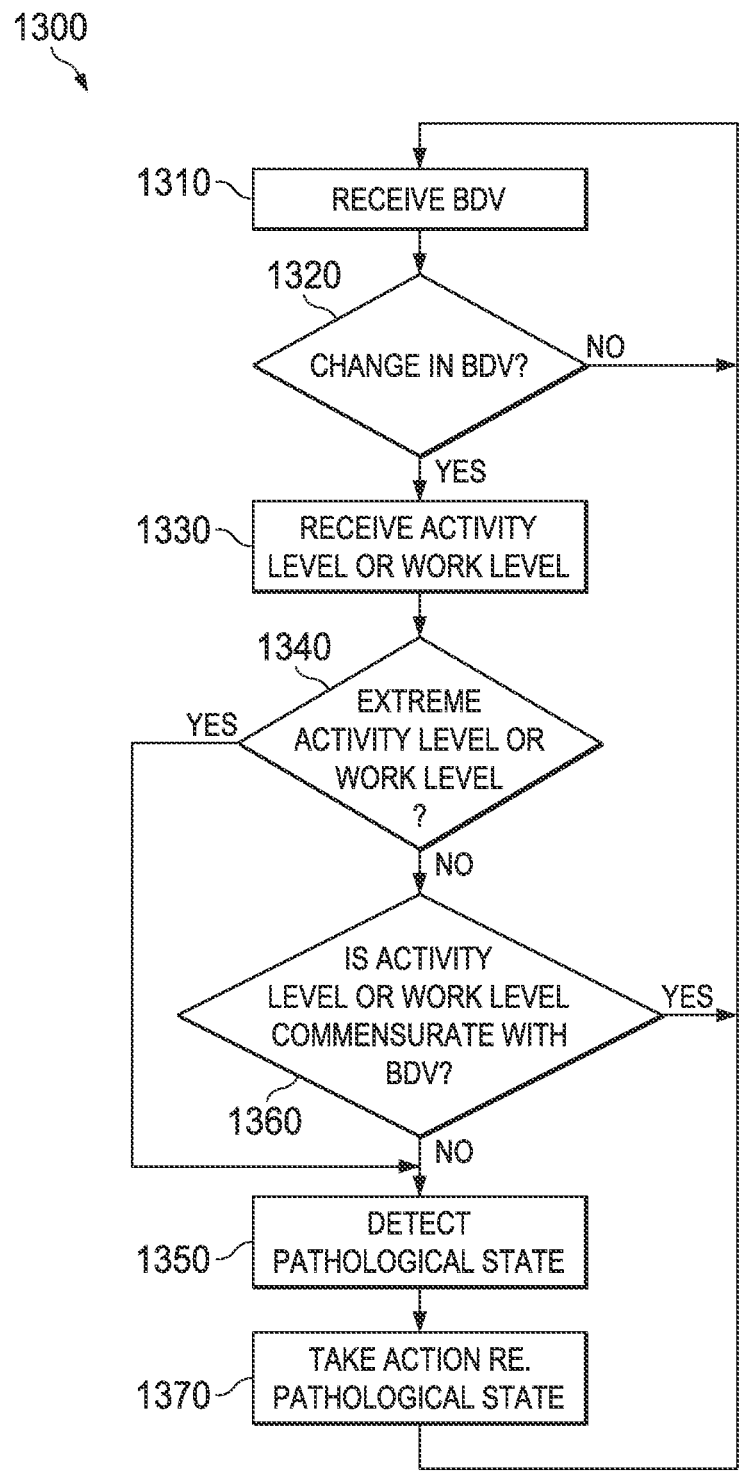
FIG. 13 shows a flowchart representation of a method, according to some embodiments of the present disclosure.

FIG. 13 shows a flowchart depiction of a method 1300, according to another embodiment of the present disclosure. A BDV may be received at 1310, and a determination whether it has changed relative to a prior BDV may be made at 1320. If a change has occurred, then an activity level and/or a work level may be received at 1330, and a determination whether the activity level and/or work level is extreme may be made at 1340. If the activity level and/or work level is extreme, then a pathological state may be detected (at 1350). If the activity level and/or work level is not extreme, a determination may be made at 1360 whether the activity level and/or work level is commensurate with the BDV received at 1310. If it is commensurate, then the patient may be concluded to be in a non-pathological state, and flow may return to 1310. If the activity level and/or work level is not commensurate, then a pathological state may be detected (at 1350). Regardless of how flow reaches the detection at 1350, an action regarding the pathological state (e.g., treating, warning, or logging the pathological state) may be taken at 1370, and flow may return to 1310.

In some embodiments, the present disclosure relates to a method of determining a pathological state in a patient, comprising receiving respiratory and cardiac data and measuring respiratory sinus arrhythmia (RSA) to determine if it is outside a non-pathological range. RSA magnitude may be calculated as the ratio between maximum and minimum heart rate for each respiratory cycle.

The methods depicted in FIGS. 6-10 and 12-13 and described above may be governed by instructions that are stored in a non-transitory computer readable storage medium and that are executed by, e.g., a processor 217 of the medical device 200. Each of the operations shown in FIGS. 6-10 and 12-13 may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

In certain embodiments, the present disclosure relates to a detection of an undesirable (e.g., pathological) state change thorough the determination of changes (e.g., increases or decreases) in the values of body indices in relation to reference values regardless of whether or not said reference value is pathological or non-pathological but taking into account the work or activity level of the patient and, where applicable, environmental conditions. For example, in the case of a patient with an abnormally elevated heart rate, a decrease in said rate toward or into the normal range may be indicative of a pathological state such as an epileptic seizure that reduces heart rate.

In some embodiments, the present disclosure relates to the following numbered paragraphs:

201. A non-transitory computer readable program storage unit encoded with instructions that, when executed by a computer, perform a method, comprising:
determining an activity level of said patient; and
determining a non-pathological range for a BDV, based at least in part on said activity level.

301. A non-transitory computer readable program storage unit encoded with instructions that, when executed by a computer, perform a method, comprising:
determining if a BDV of a patient is outside a non-pathological range;
determining if the patient's activity level is commensurate with the BDV value;
indicating the occurrence of a seizure, if the activity level is not commensurate with the BDV value.

401. A method, comprising:
receiving a first body signal of the patient;
determining a change in a first BDV, based on said first body signal;
determining an activity level of said patient;
determining if said change in said first BDV is commensurate with said determined activity level; and,
taking a further action in response to determining that said change in said first BDV is not appropriate/commensurate/expected/normal for said determined activity level.

What is claimed:

1. A medical device system, comprising:
a first set of sensors, the first set of sensors configured to collect an EMG activity signal and a heart rate variability signal from a patient;
an activity level and activity type module configured to determine via one or more processors a current activity type, a current activity level of the patient, and a current work performed by the patient, based at least in part on the EMG activity signal;
a pathological state determination module configured to determine an indicator via the one or more processors that the patient is in a seizure or an epileptic state based on the heart rate variability signal, the current activity type, the current activity level of the patient, and the current work performed by the patient;
the one or more processors configured to provide a warning;
the one or more processors configured to provide a therapy;
the one or more processors configured to determine a severity of a pathological state and determine a response to the delivered therapy;
the one or more processors configured to determine an output based on an indicator of the patient's body weight and height and to provide the output; and
a memory configured to log a determination of the pathological state; log a time of an occurrence of the seizure or the epileptic state; log a response to the therapy; and log the severity of the pathological state.

2. The medical device system of claim 1, the one or more processors is configured to determine the output based on one or more of a time of day, an environmental condition, an indicator of the patient's state, an indicator of the patient's body mass index, an indicator of the patient's gender, an indicator of the patient's age, an indicator of the patient's overall health, an indicator of the patient's overall fitness, or an indicator of the patient's level of consciousness, and provide the output relating to the determination.

3. The medical device system of claim 1, wherein the seizure or the epileptic state is an epileptic event.

4. The medical device system of claim 3, further comprising a responsive action module configured to perform via the one or more processors at least one further action selected from issuing a notice of the epileptic event and logging the severity of the epileptic event, in response to the detection of the epileptic event.

5. The medical device system of claim 1, wherein the medical device system is configured to repeat via the one or more processors the step of determining the current activity level of the patient at a sampling rate ranging from 100 times per second to about once every four hours.

6. The medical device system of claim 1, wherein the one or more processors are further configured to perform a function of determining the current activity level and the current activity type or the current work performed by the patient, using a second set of sensors that provide at least one of acceleration data, velocity data, position data, force data, or a direction of movement data and a duration of movement data.

7. A medical device system, comprising:
a first set of sensors, the first set of sensors configured to collect an EMG activity signal and a heart rate variability signal from a patient;
an activity level and activity type module configured to determine via one or more processors a current activity type or a current activity level or a current work performed by the patient, based at least in part on the EMG activity signal;
a pathological state determination module configured to determine an indicator via the one or more processors that the patient is in a seizure or an epileptic state based on the heart rate variability signal, the current activity type, the current activity level of the patient, and the current work performed by the patient;
the one or more processors configured to provide a warning;
the one or more processors configured to provide a therapy;
the one or more processors configured to determine a severity of a pathological state and determine a response to the delivered therapy;
the one or more processors configured to determine an output based on an indicator of the patient's age and to provide the output; and
a memory configured to log a determination of the pathological state; log a time of an occurrence of a detection of the seizure or the epileptic state; log a response to the therapy; and
log the severity of the pathological state.

* * * * *